United States Patent [19]

Kamody

[11] 4,265,868

[45] May 5, 1981

[54] PRODUCTION OF CARBON MONOXIDE BY THE GASIFICATION OF CARBONACEOUS MATERIALS

[75] Inventor: John F. Kamody, Irwin, Pa.

[73] Assignee: Koppers Company, Inc., Pittsburgh, Pa.

[21] Appl. No.: 876,009

[22] Filed: Feb. 8, 1978

[51] Int. Cl.³ .................................................. C01B 31/00
[52] U.S. Cl. .............................. 423/415 A; 48/197 R;
   48/203; 48/210; 252/188; 252/188.3 R;
   252/373
[58] Field of Search ................. 252/188, 373, 188.3 R;
   423/415 A; 48/197 R, 203, 210

[56] References Cited

U.S. PATENT DOCUMENTS

| | | | |
|---|---|---|---|
| 2,902,453 | 9/1959 | Matlin | 252/188 |
| 3,397,963 | 8/1968 | Wagner | 252/188 |
| 3,705,108 | 12/1972 | Marion et al. | 252/373 |
| 3,801,288 | 4/1974 | Leas et al. | 48/197 |
| 3,840,353 | 10/1974 | Squires | 48/203 |
| 3,976,442 | 8/1976 | Paull et al. | 252/373 |
| 4,040,976 | 8/1976 | Greene | 423/415 A |
| 4,081,253 | 3/1978 | Marion | 423/415 A |
| 4,094,650 | 6/1978 | Wuter et al. | 252/373 |
| 4,132,764 | 1/1979 | Cines et al. | 48/197 R |
| 4,151,107 | 4/1979 | Singleton | 252/373 |
| 4,159,201 | 1/1979 | Staege | 423/415 A X |

FOREIGN PATENT DOCUMENTS 1400065  7/1975  United Kingdom ............... 423/415 A Primary Examiner—Benjamin R. Padgett
Assistant Examiner—J. L. Barr
Attorney, Agent, or Firm—Donald M. MacKay; Herbert J. Zeh, Jr.

[57] ABSTRACT

An increased amount of carbon monoxide is produced in a process for the gasification of carbonaceous materials by employing a reverse water gas shift reaction in the process. Raw gas produced by the gasification of carbonaceous materials contains predominantly carbon monoxide and hydrogen along with hydrogen sulfide, carbon dioxide, water and methane. Carbon dioxide is separated from the raw gas as is the hydrogen sulfide. Thereafter, the carbon monoxide is separated from the raw gas to yield one portion of the carbon monoxide product gas. After the removal of carbon monoxide the raw gas consists of a hydrogen-rich gas. The hydrogen-rich gas which may be purified is mixed with the previously separated carbon dioxide along with any imported carbon dioxide and along with a recycle gas from a catalytic reaction loop. This mixed gas is conveyed to a heat exchanger in the catalytic reaction loop and passed through a heat exchanger located immediately after the gasifier through which the raw product gas passes. In the heat exchanger the hot raw product gas indirectly contacts the mixed gas and transfers some of its sensible heat to the mixed gas to effect the catalytically promoted, endothermic reaction of carbon dioxide and hydrogen to produce a carbon monoxide-containing gas. The indirect contacting for heat exchange is conducted in a manner that limits the accumulation of elemental carbon from any of the carbon-containing components of the mixed gas. The carbon monoxide is separated from the other components of the carbon monoxide-containing gas to yield a second portion of carbon monoxide gas which is then combined with the first portion of carbon monoxide product gas to give the increased amount of carbon monoxide product gas.

29 Claims, 2 Drawing Figures

PRODUCTION OF CARBON MONOXIDE BY THE GASIFICATION OF CARBONACEOUS MATERIALS

BACKGROUND OF THE INVENTION

This invention relates to a process for gasification of carbonaceous materials to produce a carbon monoxide-rich gas. More specifically, this invention relates to increasing the amount of carbon monoxide produced in a process of gasifying carbonaceous materials at elevated temperatures to maximize the yield of carbon monoxide from such a process.

Oil and natural gas are used as feedstocks or fuels for many chemical and mechanical processes. These raw materials are rapidly becoming depleted and alternative sources are being developed. One alternative source present in the United States is the vast deposits of coal. Coal, coal gasification, and coal liquefaction products are seriously being promoted as substitute feedstocks and fuels for chemical and mechanical processes.

Reducing and synthesis gases that are useful as fuels and as reactants in ore reduction processes have been produced by catalytic reforming of natural gas via the methane-steam reaction, partial oxidation of hydrocarbon fuels, and by gasification of coal and coke. Because of the depletion of oil and natural gas, more emphasis is being placed on the production of reducing and synthesis gases from coal and coke gasification. The production of a carbon monoxide-rich reducing gas by gasification of coal or coke has become of increasing interest. This carbon monoxide-rich reducing gas is useful since the carbon monoxide reacts with many metal oxides or other metallic compounds, such as metallic halides, to produce carbon dioxide and the corresponding metals or lower metal oxides. A few of the metals whose oxides are reduced by carbon monoxide include iron, aluminum, cobalt, copper, lead, manganese, molybdenum, nickel, silver and tin. In addition, a carbon monoxide-rich gas has many other chemical applications, such as the production of metal carbonyls, phosgene, toluene diisocyanate, and synthetic acids, including acetic acid. The carbon monoxide is also employed in oxo synthesis processes, and developments are reported to be underway to employ carbon monoxide for production of terephthalic acid and p-cresol, and to use it as a co-monomer in thermoplastics.

The production of carbon monoxide-containing reducing gas by coal or coke gasification has been performed for many years by blue gas generators and producers, water gas generators, blast furnaces and coke ovens. The gas produced by these methods contains carbon monoxide along with quantities of hydrogen, water, carbon dioxide, methane and hydrogen sulfide. A recent development has occurred in the art to increase the yield of carbon monoxide obtained from coal and coke gasification. This development involves pre-drying the coal to be gasified with air, oxygen, and/or steam while supplying carbon dioxide to the gasification reaction. Several examples where carbon dioxide addition to the gasifier is disclosed are in U.S. Pat. Nos. 3,801,288 (Leas et al.); 3,840,353 (Squires); and 3,976,442 (Paull et al.). According to these teachings, the carbon dioxide added to the gasifier can be produced internally in the gasification process or can be introduced from an external source. This method does increase the amount of carbon monoxide in the raw gas emitted from the gasifier but the presence of other gases, most notably hydrogen, cannot be avoided due to the natural consistency of coal as well as due to the thermo-dynamic constraints which govern gasifier performance.

It is an object of the present invention to provide a process for maximizing the production of a carbon monoxide-rich gas from a process for the gasification of carbonaceous materials.

It is a further object of the present invention to provide a gasification process to produce a carbon monoxide-rich gas in an efficient, safe, and economic manner utilizing available heat sources present in the process.

It is an additional object of the present invention to provide an integrated process gasification of carbonaceous material to supply a sufficient amount of carbon monoxide for an ore reduction process, and for utilizing carbon dioxide produced in the ore reduction process to produce more carbon monoxide in the process for gasification of carbonaceous materials.

It is another additional object of the present invention to provide a process whereby hydrogen present in gases produced by gasification processes for carbonaceous materials is utilized in the production of the increased amount of carbon monoxide from the gasification process.

SUMMARY OF THE INVENTION

According to the process of this invention, the amount of carbon monoxide produced in the gasification of carbonaceous materials is maximized in an efficient, safe, and economic manner. This is accomplished by recovering the carbon monoxide in the raw gas from the gasification of carbonaceous materials and by converting the carbon dioxide and hydrogen in the raw gas from the gasification, along with any additional carbon dioxide, into a carbon monoxide-containing gas wherein the sensible heat of the raw gas produced by the gasification of the carbonaceous material is utilized to effect the conversion.

The process of the present invention comprises: indirectly contacting the hot raw gas obtained from the gasification of carbonaceous materials with a mixed gas containing carbon dioxide and hydrogen while the mixed gas is in the presence of a catalyst that suitably promotes the reverse water gas shift reaction. The indirect contact provides the heat necessary to perform the endothermic reaction of carbon dioxide and hydrogen to produce carbon monoxide. The carbon dioxide and hydrogen in the mixed gas are obtained from the raw gas previously produced by the gasification of carbonaceous materials. Also, additional carbon dioxide can be added to the mixed gas from a source external to the gasification process.

The process of the present invention proceeds in the following manner. Raw gas is produced by the gasification of carbonaceous materials and the raw gas contains predominantly carbon monoxide and hydrogen, with some carbon dioxide and hydrogen sulfide and a minor amount of methane. Hydrogen sulfide is removed from the raw gas by an acid gas removal step. Also, carbon dioxide is removed and recovered while residual water is usually removed in the same operation. Then the carbon monoxide is separated from the hydrogen to produce a first portion of the carbon monoxide-rich gas of the present invention. The hydrogen is combined with the carbon dioxide which was removed previously from the raw gas along with any added carbon dioxide from an external source to form a mixed gas. This mixed gas is conveyed to an heat exchanger for the indirect contact with the raw gas produced by the gasification of the carbonaceous material. The heat exchanger is located immediately after the gasifier, and in the heat exchanger the mixed gas is in the presence of a conventional water gas shift reaction catalyst while indirectly contacted with the hot raw gas. The indirect contacting is conducted in such a manner as to limit the accumulation of elemental carbon from any of the carbon-containing components in the raw gas. The sensible heat of the hot raw gas enables the water gas shift reaction to proceed whereby a carbon monoxide-containing gas is produced. The carbon monoxide in this gas is separated and combined with the first portion of carbon monoxide to yield the carbon monoxide-rich product gas of the present invention.

To promote activity and to prevent deactivation of water gas shift reaction catalyst, the mixed gas can be preheated before it is placed in the presence of the catalyst by indirect heat exchange contact with the raw gas from the gasification of carbonaceous materials. The preheating avoids catalyst deactivation by limiting the deposition of carbon upon the catalyst.

To take full advantage of maximizing the amount of carbon monoxide produced in the gasification of carbonaceous materials, the process of the present invention may include introducing carbon dioxide to the gasification reaction to increase the amount of carbon monoxide in the raw gas from gasification.

The process of the present invention can be integrated with an ore reduction process. The integrated process would involve using the carbon monoxide-rich gas produced in the process of the present invention to reduce ores and using a portion of about 30 volume percent to about 80 volume percent of the carbon dioxide given off in the ore reduction process to be added to the mixed gas of carbon dioxide and hydrogen and/or be introduced into the gasification reaction in the process of the present invention.

GENERAL DESCRIPTION OF THE INVENTION

Figure 1:
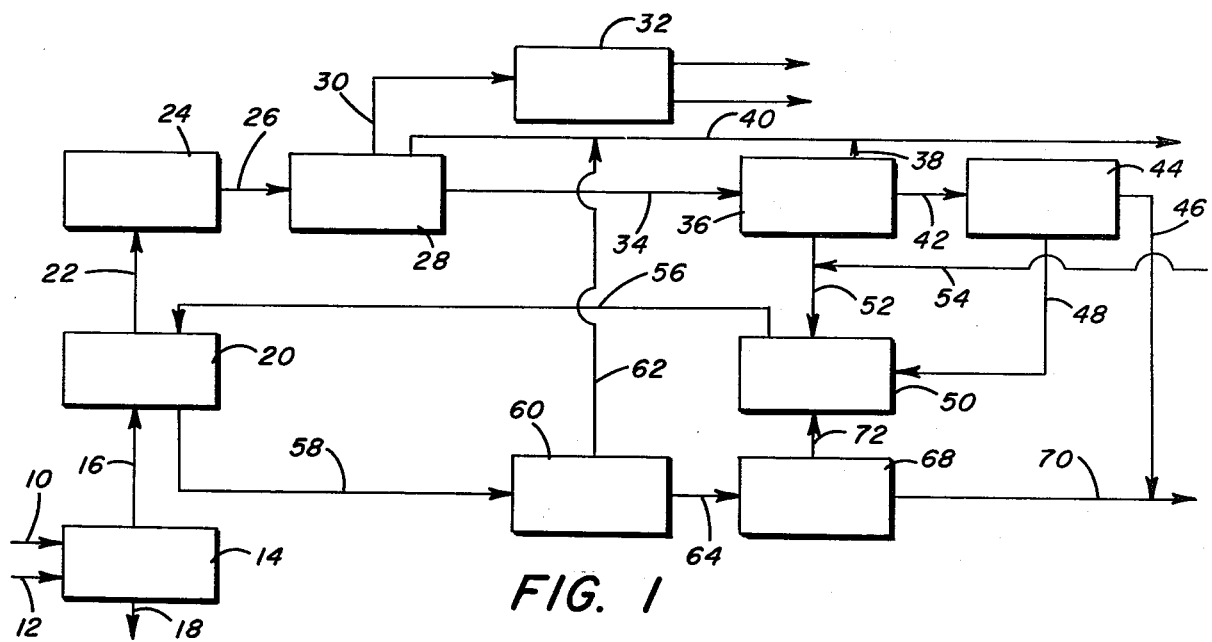
FIG. 1—Block flow diagram of the inventive process in its broadest aspects.

Before describing the preferred embodiment of the present invention, a general description of the process of the invention in its broadest aspects is given with reference to FIG. 1.

Referring to FIG. 1, carbonaceous materials is conveyed to the gasifier by conduit 10. This carbonaceous material includes any type of coal of which nonlimiting examples are anthracite, subanthracite, lignite, bituminous coal and subbituminous coal, and also includes cokes either coal or petroleum derived, char, and liquid hydrocarbons. The carbonaceous material may be slurried with water or other liquids to expedite its introduction into the gasifier. If the carbonaceous material is coal, it is usually dried and ground to fine sizes. Also conveyed to the gasifier 14 is the entraining medium that reacts with the carbonaceous material to produce the raw gases emitted from the gasifier. The entraining medium can be oxygen, air, steam, or carbon dioxide, with or without water, or any mixture thereof. However, air is not used alone as the entraining medium but in combination with any other aforementioned entraining mediums. Nor is it used excessively, since undesirable inert gases such as nitrogen and argon will be present and will be carried along in the processing. Also, the use of steam is undesirable with carbonaceous materials that contain a large amount of moisture or are slurried with water into the gasifier.

The carbonaceous material and entraining medium conveyed to gasifer 14 are reacted therein to produce hot raw gas. This gas contains predominantly carbon monoxide and hydrogen with smaller amounts of water vapor, carbon dioxide, hydrogen sulfide, carbon disulfide and methane. The amount of methane in the raw gas is usually less than 1.0 volume percent, whenever the gasifier operates at temperatures in excess of about 2000° F. The gasification reaction is conducted by any method known to those skilled in the art that will produce a raw gas with the aforementioned constituents at a temperature leaving the gasifer greater than 1300° F. (704° C.). The pressure of the gasifier can range from 1 atmosphere to 175 atmospheres, absolute. Examples of such gasification reactions include those reactions conducted in gasification vessels by entrained flow, or in a fixed bed reactor or fluidized bed reactor in any flow arrangement. The raw gas leaving the gasifier by conduit 16 may possibly contain, in addition to the aforementioned constituents, some ungasified carbonaceous material, slag, ash and tar. If any molten slag is entrained with the gas, the gas would be sprayed with water or cooled with a recycle gas to prevent any subsequent adhesion of the slag to any heat transfer surfaces located after the gasifier. Remaining ash or slag that does not leave the gasifier entrained in the raw gas is removed from the gasifier by conduit 18.

The raw gas in conduit 16 is conveyed to Heat Exchanger 20 at a temperature usually in the range of around 2000° F. (1093° C.). The heat exchanger may be any conventional heat exchanger for indirectly contacting a hot gaseous fluid with a cool fluid that is in the presence of a catalyst. Examples of such heat exchangers include those wherein the hot gaseous fluid passes over tubes packed with catalyst and containing the cooler fluid, or wherein the hot gaseous fluid may pass through tubes that are enveloped in a catalyst bed or fluidized bed of catalyst in direct contact with the cooler fluid. The raw gas leaving heat exchanger 20 is cooled to a temperature in the range of about 600° F. (316° C.) to about 1000° F. (538° C.).

These cooled raw gases are conveyed to other process steps by conduit 22. These subsequent process steps may vary to some degree regarding the location of particulate removal or additional heat exchange equipment. Usually, as in FIG. 1, the cooler raw gas in conduit 22 is conveyed to Particle Removal Zone 24, although further heat may be removed from the cooler raw gas by additional heat exchangers or waste heat or steam boilers before particles are removed from the gas and the gas is compressed. Alternatively, the raw gas conveyed by conduit 22 may be used to indirectly preheat the entraining medium which enters the gasifier by conduit 12 before particulates are removed from the raw gas. In zone 24, any remaining ash or slag particles are removed from the raw gas by mechanical centrifugal separators, cyclone separators, venturi scrubbers, gravity separators or electrostatic precipitators.

The gas leaves zone 24 via conduit 26 and is conveyed to an Acid Gas Removal Zone 28. In this zone, hydrogen sulfide, carbonyl sulfide and, unavoidably, some carbon dioxide are removed from the gas. This removal is accomplished by any one of several of the well-known acid gas removal processes. The chemical reaction processes such as amine and carbonate systems may be used or physical absorption processes known by trade designations of Rectisol, Purisol and Selexol may be used. The recovered sulfur-containing gases are conveyed via conduit 30 to a sulfur removal zone 32, which may be the well-known Claus process or Stretford process, for recovery of elemental sulfur. The carbon dioxide that is unavoidably removed from the raw gas with the hydrogen sulfide may be recovered if sulfur-containing gases are recovered by the Stretford process. This recovered carbon dioxide may be combined with the carbon dioxide subsequently recovered from the raw gas and from any external sources to be reacted with hydrogen in the reverse water-gas shift reaction.

The desulfurized gas is conveyed from the Acid Gas Removal Zone 28 by conduit 34 to a Carbon Dioxide and Water Removal Zone 36. Here carbon dioxide is removed from the gas by any known method, such as scrubbing and absorption with cold methanol. In addition, residual water vapor that was not removed in zone 28 ordinarily will be removed simultaneously with the carbon dioxide. The water is conveyed from the $CO_2$ Removal Zone 36 by conduit 38 and combined with water in conduit 40 from the Acid Gas Removal Zone 28 and all this water is removed from the process. Also, the gas may be dried in zone 36 by using a chemical absorbent, such as triethylene glycol.

The raw gas that has now been cooled and cleaned is conveyed by conduit 42 to a Carbon Monoxide Recovery Zone 44 for a recovery of a portion of the product of this invention. The CO recovery step may be performed by any method known to those skilled in the art, such as cryogenic separation methods such as those taught in German Offenlegungschrift No. 2,323,410, hereby incorporated by reference, or by selective chemical methods as taught in German Offenlegungschrift No. 2,057,162, also hereby incorporated by reference. Alternatively the carbon monoxide may be recovered by the "Cosorb" process available from Tenneco Chemicals, Inc. The carbon monoxide product is removed from the CO Recovery Zone by conduit 46 as the first portion of the carbon monoxide-rich gas of the process of the present invention.

The remaining gas of what was originally the raw gas contains mostly hydrogen. If this hydrogen-rich gas contains more than about two percent by volume of nitrogen and argon, then the hydrogen-rich gas should be subjected to a hydrogen purification step (not shown in FIG. 1). The hydrogen purification step would be added to remove inerts from the hydrogen-rich gas by any known process, such as the use of molecular sieves, or an alternative means such as is disclosed in U.S. Pat. No. 3,113,889, hereby incorporated by reference. The hydrogen-rich gas is conveyed from the CO Recovery Zone by conduit 48 to Mixing Zone 50. In this zone the hydrogen-rich gas is mixed with the carbon dioxide conveyed from the Carbon Dioxide Removal Zone 36 by conduit 52 to the Mixing Zone and with recycle gas conveyed by conduit 72 from the reverse water gas shift reaction, which is described in greater detail infra. Also, additional carbon dioxide can be supplied from a source external to the process and combined with the carbon dioxide in conduit 52 or supplied directly to Mixing Zone 50. In FIG. 1 this additional carbon dioxide is supplied to conduit 52 by conduit 54. This mixing zone can be any vessel known to those skilled in the art for mixing gases and can even consist of merely a wider diameter conduit than the conduits conveying the gases to the mixing zone.

The mixed gas containing predominantly carbon dioxide and hydrogen is conveyed from the Mixing Zone by conduit 56 to Heat Exchanger 20. Here the raw gas from conduit 16 indirectly contacts the mixed gas while the mixed gas is in the presence of a water gas shift reaction catalyst. The sensible heat of the raw gas provides the heat needed to conduct the catalytically promoted, endothermic, reverse, water gas shift reaction:

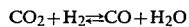   Eq. 1

By using this reaction, the hydrogen contained in the raw gas from the gasifier may ultimately react with carbon dioxide externally to the gasifier, to generate additional carbon monoxide, and thereby overcome the constraints of increasing the carbon monoxide content of the raw gas in the gasifier.

The reaction represented by Equation 1 is endothermic and therefore requires high temperatures, for example, around 1000° F. (538° C.) to about 1500° F. (816° C.) to promote the equilibrium formation of carbon monoxide. In addition, the use of high temperatures discourages various exothermic reactions such as

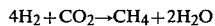   Eq. 2 which compete for the available hydrogen. From a kinetic standpoint, the reaction represented by Equation 1 is slow unless promoted by the use of elevated pressures or by the use of well-know catalysts. Examples of these catalysts include: one or more metals of the Groups VIb, VIIb and/or VIII of the Periodic Table, as an active agent which metals or their mixtures are used as such or as their oxides and/or sulfides, the sulfides being used when a sulfur resistant catalyst is required. The sulfur resistant catalyst is needed if acid gases are not removed from the raw gases and they are allowed to travel through the process. In addition, commercially available catalysts commonly used in the steam reforming of natural gas may be used. An example of such a catalyst would be that which is available from Catalysts and Chemicals, Inc. under the trade description "C11-9". If the catalyst becomes deactivated due to carbon deposits, the catalyst may be subjected to oxidation to burn off the carbon, thereby regenerating the catalyst. Alternatively, the deposition of carbon on the catalyst can be avoided by preheating the cool gas before it contacts the catalyst.

The carbon monoxide-containing gas leaving the heat exchanger is conveyed by conduit 58 to a Water Condensation and Gas Dehydration Zone 60 to remove water present as a product from the reverse water gas shift reaction. The water can be removed by any process known to those skilled in the art, for example, by cooling the gas and, if desired, extensive drying of the gas by a well-known chemical method such as absorption with ethylene glycol or triethylene glycol. Also, since the carbon monoxide-containing gas in conduit 58 is at an elevated temperature after the reverse water gas shift reaction, heat exchangers or waste heat boilers may be used to recover some heat before the gas is treated for removal of water. The water removed is combined by conduit 62 with other water recovered in the process. The heat contained in gas conveyed by conduit 58 may, if so desired, be used for indirectly heating all or a portion of the entraining medium (up to 1000° F.) which is conveyed into the gasifier by conduit 12. Likewise, this heat may be used for indirectly heating all or a portion of the carbon monoxide product of this invention to thereby provide the carbon monoxide product at temperatures in excess of 1000° F. (538° C.), which is especially desirable in some direct ore reduction processes. If the carbon monoxide product is heated in such a manner there is a possibility that a small amount of elemental carbon can form from the carbon monoxide. If this happens, the elemental carbon may be separated from the heated carbon monoxide product whereupon such elemental carbon would be combined with the carbonaceous feed introduced to the gasifier by conduit 10 so that such elemental carbon may be re-gasified.

The dehydrated carbon monoxide-rich gas is conveyed by conduit 64 to another Carbon Monoxide Recovery Zone, Zone 68. This zone may employ any process known to those skilled in the art to remove carbon monoxide to constitute the second portion of carbon monoxide produced by the process of the present invention. This portion of carbon monoxide is conveyed by conduit 70 to be combined with the carbon monoxide in conduit 46 to form the carbon monoxide-rich gas produced by the process of the present invention for use in ore reduction or chemical processing. The other gases in the gas of conduit 64, e.g., unreacted carbon dioxide and unreacted hydrogen along with a small amount of methane, are recycled by conduit 72 to the reverse water gas shift loop directly by the Mixing Zone 50. The methane present in the gas recycled by conduit 72 equates to the steady-state concentration (which approximates equilibrium conditions) of methane present in the gas leaving the heat exchanger via conduit 58. Thus, there is no net formation of methane, ordinarily. An exception occurs whenever the raw gas produced in the gasifier contains significant amounts of methane, which ordinarily would not be the case since, as previously mentioned, the raw gas leaving the gasifier is at a temperature in excess of 2000° F. when the invention is practiced typically. Methane present in the raw gas would be recovered along with the hydrogen which is conveyed by conduit 48 from the CO recovery zone 44. This methane would clearly then ultimately contact the catalyst contained within the heat exchange zone 20, whereupon there would be a net destruction of methane to additional carbon monoxide by endothermic means such as,

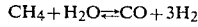

$$CH_4 + H_2O \rightleftharpoons CO + 3H_2 \qquad \text{Eq. 3}$$

Since the aforedescribed process required conveying gases and some liquids to and from various zones, those skilled in the art will realize that motive forces must be installed at various locations in the process. These motive forces include difference in pressures between zones, compressors and pumps. The locations of these motive forces will be those necessary to move the materials throughout the entire process.

Although the invention in its broadest scope features use of two separate CO recovery zones, i.e., 44 and 68, it is possible under certain circumstance to use just one CO recovery zone. This circumstance arises when the inert compounds, i.e., nitrogen or argon, present in the raw gas are sufficiently low in a concentration to avoid the use of the aforementioned hydrogen purification step which may be rendered to gas conveyed by conduit 48 from the CO recovery zone 44. In such a circumstance, gas conveyed by conduit 64 from Water Condensation Zone 60 would be directly conveyed to the CO Recovery Zone 44 and the CO Recovery Zone 68 would be eliminated. In such a case, the gas conveyed by conduit 48 from CO Recovery Zone 44 would contain principally the hydrogen initially present in the raw gas along with the recycled gas ordinarily characterized as that conveyed by conduit 72. The gas conveyed by conduit 48 would then be conveyed to Mixing Zone 50. Also, under this circumstance the CO removed by conduit 46 would contain the aforementioned first portion of CO product along with the increased portion of CO product afforded by the invention. Furthermore, it should be noted that an additional means of eliminating a hydrogen purification step would involve taking a "bleed stream" from the system (not shown on FIG. 1), for example, from the gas conveyed by conduit 64, as a means of removing continuously or periodically the inert compounds from the system.

The total yield from both portions of carbon monoxide in accordance with this invention gives 30-80% more carbon monoxide than in the prior disclosed methods for gasification of carbonaceous materials.

An additional advantage of the invention is that the raw gas which indirectly contacts the carbon dioxide and hydrogen-rich mixed gas contains essentially no free oxygen, i.e., less than 0.1 volume percent. This minimizes the possibility of explosion in the event of a failure of the heat exchanger materials of construction. Whereas, if a hot combustion gas were used alternatively to the hot raw gas from the gasifier, then the free oxygen always present in the combustion gas poses an imminent safety hazard. Such explosions have been known to occur in heretofore known furnaces, such as those used in the steam reforming of natural gas.

PREFERRED EMBODIMENT

Figure 2:
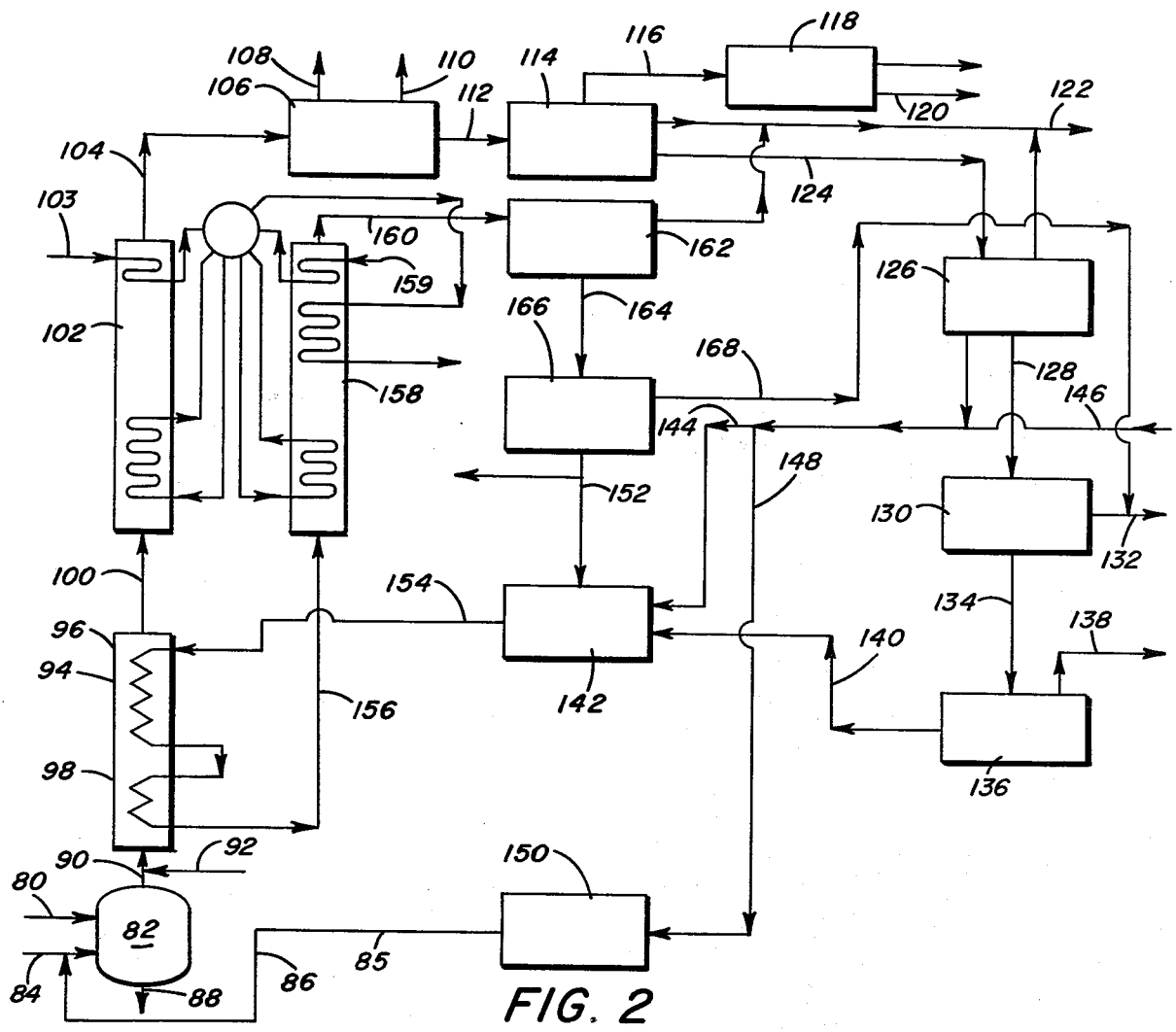
FIG. 2—Schematic diagram of preferred embodiment of the invention.

For a better understanding of the present invention, its objects and advantages, reference should be had to the following decription of the preferred embodiment of the present invention and to FIG. 2 which illustrates schematically the preferred embodiment of the present invention.

The preferred gasification process used with the process of the present invention is the Koppers-Totzek gasification process, better known as the K-T gasification process. This process employs the partial oxidation of a carbonaceous feed in suspension with oxygen and steam to produce a product gas high in carbon monoxide and hydrogen with negligible amounts of methane. The process does not produce tars, oils or phenols and the by-products are elemental sulfur and a granulated slag.

As shown in FIG. 2, coal, which is dried to a degree depending upon its rank and pulverized, is conveyed by conduit 80 into gasifier 82 wherein it is entrained with oxygen and carbon dioxide. Alternatively, steam may be used instead of carbon dioxide, but carbon dioxide is preferred for practice of the invention. The oxygen is added to the gasifier by conduit 84 and the carbon dioxide is added to the gasifier by conduit 86. The gasifier 82 operates with entrained flow of these reactants, coal, oxygen, and carbon dioxide, and exothermic reactions produce a flame temperature of around 3500° F. (1927° C.). The gasification of the coal is almost complete and instantaneous. A gas containing predominantly carbon monoxide and hydrogen with smaller amounts of carbon dioxide, hydrogen sulfide, carbonyl sulfide, methane, nitrogen, and argon and water leave the gasifier at a temperature characteristically ranging from about 2500° F. (1371° C.) to about 3000° F. (1649° C.). This exit temperature is somewhat lower than the flame temperature due to heat losses and endothermic reactions which occur beyond the flame zone. The oxygen conveyed to the gasifier will normally have a purity of at least 98 volume percent in order to minimize the inert content of the ultimate carbon monoxide product or to minimize the subsequent accumulation of inerts within the various gas processing steps that are employed. Ash in the coal feed is liquified at the high reaction temperature and approximately 20 to 70 percent of the molten ash drops out of the gasifier into a slag quench tank (not shown in FIG. 2) via conduit 88.

The raw gas exits gasifier by conduit 90 and is sprayed with water introduced by conduit 92 in order to lower the gas temperature to slightly below the fusion temperature (1900° F. to about 2400° F.) (1038° C. to 1316° C.) of the molten ash particles carried by the gas so that there is no subsequent adhesion of slag to heat transfer surfaces. Alternatively, cool recycled gas instead of water spray may be used for cooling the gas by the methods taught in U.S. Pat. No. 3,963,457. The raw gas, having been sprayed with water, enters heat exchanber 94 where a portion of the available sensible heat of the gas is indirectly transferred to effect the catalytically promoted endothermic reaction of carbon dioxide and hydrogen. The carbon dioxide and hydrogen are provided by mixed gas containing predominantly carbon dioxide and hydrogen which is produced in a subsequent step of the process and conveyed to heat exchanger 94 by conduit 154. Normally the mixed carbon dioxide-hydrogen rich gas to be reacted will flow preferably in a counter-current fashion to the raw gas from the gasifier. However, any flow arrangement may be used as long as the temperature of the gas leaving the gasifier is, at a given point along the axis of flow, higher than the temperature of the carbon dioxide-hydrogen rich gas.

As carbon dioxide reacts with hydrogen to form carbon monoxide and water via the reverse gas shift reaction, it is important to give due consideration to means of preventing the formation of carbon (soot) which can occur as the gas is heated. A common well-known mechanism by which carbon can form is described by the reaction

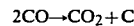
$$2CO \rightarrow CO_2 + C \qquad \text{Eq. 4}$$

This reaction is discouraged by employing high temperatures and, for the typical carbon monoxide and carbon dioxide partial pressures which are encountered in the practice of the invention, carbon will not form above temperatures ranging from 850° to 950° F. (454° C. to 510° C.). Therefore, to prevent the possibility of carbon formation upon the catalyst surfaces, the invention features the use of two treatment stages within heat exchanger 94. The first stage 96 is a heating stage wherein the mixed gas, which has a negligible carbon monoxide content, is first heated without the use of a catalyst to a temperature greater than the temperature at which carbon can theoretically form within the second stage 98, which is a catalyst-containing reaction stage. The catalyst in the second reaction stage is preferably a catalyst packed tube through which the mixed gas flows while in indirect contact with the hot reducing gas. The catalyst is any conventional water gas shift reaction catalyst, for example, 85 weight percent of $Fe_2O_3$ and 15 weight percent of $Cr_2O_3$, to convert the carbon dioxide and hydrogen into carbon monoxide and water. Alternatively, a cobalt-molybdenum shift catalyst may be used. Alternatively, ceramic type catalyst commony used in the steam reforming of natural gas may be used, for example, the catalyst available from Catalysts and Chemicals, Inc. under the trade designation "C11-9" could be used. The mixed gas flows into the first stage 96 and is in indirect contact with the raw gases from the gasifier and is heated to a temperature in the range of about 850° F. (454° C.) to 950° F. (510° C.) and then flows into the second stage of the heat exchanger and through the packed catalyst tube. Here the carbon dioxide and hydrogen in the mixed gas react to produce carbon monoxide and water to yield a carbon monoxide-containing gas by Equation 1. The heat for this endothermic reaction is provided by the sensible heat of the raw gas that indirectly contacts the mixed gas in the presence of the catalyst.

The cooled raw gas leaves the heat exchanger via conduit 100 at a temperature in the range from about 600° F. to about 1000° F. (316° C. to 538° C.) and passes to steam generator 102 wherein most of the remaining sensible heat of the gas is regained in the form of steam. The cooled raw gas leaves the steam generator at temperatures ranging from about 250° F. to about 450° F. (121° C. to 232° C.) and then is scrubbed of particles and compressed, if necessary, in Particle Removal and Compression Zone 106. The particles are removed from zone 106, as is the water, via conduits 108 and 110, respectively.

The cooled scrubbed and compressed gas leaves zone 106 via conduit 112 to Acid Gas Removal Zone 114 wherein sulfurous compounds, hydrogen sulfide and carbon oxysulfide and unavoidably a portion of carbon dioxide (usually around 10%), are removed by either the Rectisol, Purisol or Selexol physical absorption process. The recovered gases from the acid gas removal zone are sent to a sulfur recovery unit 118 via conduit 116. In the sulfur recovery unit, which is preferably a Claus process, elemental sulfur is recovered in conduit 120. Any water removed in the acid gas removal zone is removed from the process by conduit 122.

Desulfurized gas leaving the acid gas removal zone via conduit 124 is treated in Carbon Dioxide and Water Removal Zone 126 for removal of carbon dioxide, preferably by the absorption with chilled methanol. Residual water vapor will also be removed simultaneously with the carbon dioxide and this water is conveyed to conduit 122 for removal from the process.

The gas removed from the carbon dioxide and water removal zone contains chiefly carbon monoxide and hydrogen. This gas is conveyed by conduit 128 to a Carbon Monoxide Recovery Zone 130. Herein the first portion of the carbon monoxide product from the applicant's improved process is recovered, preferably by the "Cosorb" process available from Tenneco Chemicals, Inc. The carbon monoxide product gas is removed from the carbon monoxide recovery zone via 132. The remaining gas removed from the carbon monoxide recovery zone is rich in hydrogen and is preferably conveyed via conduit 134 to Hydrogen Purification Zone 136 wherein any nitrogen and argon is removed and conveyed from the process via conduit 138. Employing this hydrogen purification step minimizes the impurity content of gas stream circulated through the process and further minimizes the amount of purge stream which must be taken for deaccumulation of inerts.

The hydrogen-rich gas from the hydrogen purification zone is conveyed via conduit 140 to a high pressure compressor assembly 142 wherein it is mixed with carbon dioxide from the carbon dioxide and water removal zone which is conveyed to zone 142 by conduit 144. Additional carbon dioxide can be introduced into the process from an external source by conduit 146 which introduces the carbon dioxide into conduit 144. The imported carbon dioxide equates to the carbon dioxide fed into the gasifier plus the carbon dioxide removed in the acid gas removal zone plus carbon dioxide to be ultimately reacted catalytically with available hydrogen plus any minor carbon dioxide losses, e.g., leaks, less the carbon dioxide contained in the gas leaving the gasifier. This imported carbon dioxide may come from any available source and preferably should contain 2% or less of gases which are inert to the process. This carbon dioxide could be recovered from any remotely available combustion gas or could be produced synthetically, as by the reaction of a mineral acid with limestone. For direct ore reduction application there would rarely be an instance when carbon dioxide would not be available for import to the process. This occurs because carbon dioxide is generated in the reduction process, e.g., $$Fe_2O_3 + 3CO \rightarrow 2Fe + 3CO_2 \qquad \text{Eq. 5}$$

on an equimolar basis to the amount of carbon monoxide reacted. For bituminous coal, typically only 30% or less of the carbon monoxide generated in the reduction process need be recovered for return to the carbon monoxide production process. Before the internal and external sources of $CO_2$ that are conveyed in conduit 144 are delivered to the high pressure compressor assembly 142, a portion of the carbon dioxide is diverted via conduit 148 to compressor 150 and then on to the gasifier via conduit 86. The portion of carbon dioxide diverted to be introduced into the gasifier is generally in the range of an amount greater than 0 to about 50% and typically around 30% of the total carbon dioxide contained in conduit 144 before conduit 148 begins. In addition to carbon dioxide and hydrogen being introduced into zone 142, recycled gas from the carbon monoxide catalytic reaction loop is also introduced into zone 142 by conduit 152. The carbon monoxide catalytic reaction loop includes both zones 96 and 98 of heat exchanger 94, conduit 156, steam generator 158, conduit 160, Water Condensation and Gas Dehydration Zone 162, conduit 164, Carbon Monoxide Recovery Zone 166, conduit 152, High Pressure Compressor Assembly 142, and conduit 154.

Carbon dioxide, hydrogen and recycled gas from the catalytic reaction loop are introduced to appropriate stages of a high pressure compressor assembly for delivery of the resulting mixture via conduit 154 to the first stage 96 of the heat exchanger 94. Typically, the gas in conduit 154 of the carbon monoxide catalytic reaction loop is delivered at a pressure ranging from about 20 to about 175 atmospheres absolute, thereby to enhance the heat transfer rates and/or reaction rates of the first stage 96 (heating zone) of the heat exchanger and second stage 98 (catalytic reaction zone) of the heat exchanger. The compressor assembly 142 would not be equipped with an after-cooler to thereby retain a portion of the heat of compression and hence reduce the heat load required in zone 96. Present technology permits the gas in conduit 154 to leave the compressor at temperatures from up to 450° F. (232° C.) to about 500° F. (260° C.)

The gas delivered to the first stage 96 is heated within this stage to a temperature ranging from about 850° F. to about 950° F. (454° C. to 510° C.) and then passes to the catalyzed reaction stage 98 wherein the gas is further heated to temperatures in the range from about 1300° F. to about 1600° F. (704° C. to 871° C.) where the catalyst is typically composed of 85 weight percent of $Fe_2O_3$ and 15 weight percent of $Cr_2O_3$ which is packed in the tube through which the gas flows in the second stage. In the second stage the carbon monoxide is chemically formed at the same rate at which available hydrogen is generated from the gasifier.

The carbon monoxide-containing gas leaving the catalyzed reaction stage 98 flows via conduit 156 to steam generator 158. The flow of boiler feed water into steam generator 158 and steam generator 102 via conduit 159 and 103, respectively, as well as the flow of steam or hot water through steam generators 102 and 158 is preferably integrated so that superheater coils are located within the steam generator 158 since the sulfur-free gas in conduit 156 would be less damaging to the tubes of the superheater, thereby requiring less periodic maintenance. The carbon monoxide-containing gas leaves the steam generator 158 at temperatures ranging from about 300° F. (149° C.) to about 500° F. (260° C.) by conduit 160. This gas is introduced to a water condensation and gas dehydration zone 162. Water is then removed by cooling the gas, and extensive drying of the gas is performed by absorption with triethylene glycol, where a suitable azeotropic distillation agent like iso-octane can be used.

Dehydrated carbon monoxide-rich gas is removed from zone 162 in conduit 164 and sent to Carbon Monoxide Recovery Zone 166 to produce the second portion of the carbon monoxide-rich gas product of applicant's invention. This second portion of carbon monoxide product is removed from the carbon monoxide recovery zone by conduit 168 and is combined with the first carbon monoxide product in conduit 132. Preferably the combined carbon monoxide product is conveyed via conduit 132 to an ore reduction process. The gas leaving the carbon monoxide recovery zone 166 via conduit 152 is recycled to the catalytic reaction loop. From conduit 152 there is an inert purge 170 to remove any inert gases from the recycle gas to avoid the buildup of these inert gases. The gas in conduit 152 contains unreacted hydrogen, unreacted carbon dioxide and a small amount of methane.

The gas in conduit 154 fed to the first stage 96 of the heat exchanger 94 will be composed principally of carbon dioxide and hydrogen, normally in approximately an equimolar ratio, along with typically 5% methane and less than 3% total carbon monoxide, water vapor and inerts. The gas in conduit 156 leaving the reverse water gas shift catalytic reaction zone will contain the same components as the gas in conduit 154, except additional carbon monoxide and water vapor with a corresponding equimolar reduction in carbon dioxide and hydrogen will be present. The concentrations of the components in the gas in conduit 156 will approximately correspond to those attainable upon equilibrium of the gas at the temperature and pressure of this gas. The methane present in the gas is formed by the reactions:

$$CO_2 + 4H_2 \rightleftharpoons CH_4 + 2H_2O \qquad \text{Eq. 6}$$

$$CO + 3H_2 \rightleftharpoons CH_4 + H_2O \qquad \text{Eq. 7}$$

The content of methane reaches a steady-state level where the methane contained in feed gas in conduit 154 equates to the equilibrium amount of methane in the exit gas in conduit 156. Thus, there is ordinarily no net formation of methane. An exception occurs whenever the raw gas exiting the gasifier by conduit 90 contains significant amounts of methane, which ordinarily is not the case since the gasifier 82 is preferably operated at a flame temperature of about 3500° F. Methane present in the raw gas would appear in the hydrogen-rich gas conveyed by conduit 140 into the CO catalytic reaction loop. Upon entering the CO reaction loop, this methane is reacted, endothermically, via the reverse reactions of reactions 6 and 7 to thereby form additional carbon monoxide or hydrogen which can in turn react with carbon dioxide via reaction 1.

A feature of the preferred embodiment of the process of applicant's invention involves making sure that the gas in conduit 154, which is fed into the heating stage 96 of heat exchanger 94, is not of such a rate that insufficient sensible heat is available in the gas from conduit 90 containing the raw gas from the gasifier, so that the desired heating of the gas and endothermic formation of carbon monoxide by the reverse water gas shift catalyst reaction would not be achieved. This situation is prevented by insuring that the steady-state concentration of methane in the reaction loop does not exceed approximately 40% by volume. This high level methane can be avoided by designing the process to insure that the gas in conduit 156 is kept at a temperature of at least 1300° F. (704° C.) for the range of pressures of about 20 to about 175 atmospheres that are encountered.

The procedure for determining the components and their amounts in the gas in conduit 154 which is fed to the first heating stage 96 of heat exchanger 94 of the process involves first establishing the amount of carbon dioxide which is to be chemically formed in the reaction zone 98 and then to compute in a straightforward manner the feed gas in conduit 154 subject to the constraints of a mass balance and equilibrium conditions for the gas in conduit 156.

In order to further illustrate the invention, attention is directed to the following comparative examples.

The following comparative examples are based on the gasification of a bituminous coal of Kentucky origin. After drying and pulverization, the coal fed to the gasifier has the following ultimate analysis:

|  | Weight Percent |
| --- | --- |
| Carbon | 73.8 |
| Hydrogen | 5.0 |
| Nitrogen | 1.4 |
| Sulfur | 3.2 |
| Oxygen | 5.3 |
| Ash | 9.3 |
| Moisture | 2.0 |
|  | 100.0 Total. |

A high temperature entrained-flow type gasifier is to be employed and is designed with a gas production capability of 5,415.0 lb. moles/hr., or 34,250 standard cubic feet per minute.

EXAMPLE 1

The reactants introduced into the gasification process of the prior art include coal, oxygen, and steam. Table I shows the amounts of reactants, the components and amounts of the raw gas produced in the gasifier and total amounts of carbon monoxide, carbon dioxide and hydrogen produced.

TABLE I

| Gasifier Feeds, lbs/hr |  |  |  |
| --- | --- | --- | --- |
| Coal | 50,381 |  |  |
| Oxygen (98% purity) | 46,385 |  |  |
| Steam | 19,912 |  |  |
| Carbon Dioxide | 0 |  |  |
| Total | 116,678 |  |  |

| Raw Gas Produced: | lb/hr | lb-moles/hr | vol. % |
| --- | --- | --- | --- |
| Carbon Monoxide | 69,471 | 2481.1 | 45.82 |
| Carbon Dioxide | 20,240 | 460.0 | 8.49 |
| Hydrogen | 3,194 | 1597.2 | 29.50 |
| Water | 13,885 | 771.4 | 14.25 |
| Nitrogen and Argon | 1,537 | 54.9 | 1.01 |
| Hydrogen Sulfide | 1,629 | 47.9 | 0.88 |
| Carbonyl Sulfide | 150 | 2.5 | 0.05 |
| Total | 110,106 | 5415.0 | 100.00 |
| Ungasified Coal and Ash, lb/hr | 6,572 |  |  |
| Total CO Produced |  |  |  |
| lb/hr | 69,471 |  |  |
| lb/lb coal | 1.379 |  |  |
| lb-moles/hr | 3,481 |  |  |
| Total CO + $H_2$ Produced |  |  |  |
| lb-moles/hr | 4078.3 |  |  |
| lb-moles/lb coal | 0.0809 |  |  |

EXAMPLE 2

The reactants introduced into the gasification process of the prior art, known as the KT Gasification Process, include coal, oxygen, and carbon dioxide. Table II shows the amounts of reactants; the components and amounts of the raw gas produced in the gasifier; and total amounts of carbon monoxide, carbon dioxide, and hydrogen produced that are used or produced in the prior art gasification process.

TABLE II

| Gasifier Feeds, lbs/hr |  |  |  |
| --- | --- | --- | --- |
| Coal | 55,187 |  |  |
| Oxygen (98% purity) | 50,685 |  |  |
| Steam | 0 |  |  |
| Carbon Dioxide | 30,360 |  |  |
| Total | 136,232 |  |  |

| Raw Gas Produced: | lb/hr | lb-moles/hr | vol. % |
| --- | --- | --- | --- |
| Carbon Monoxide | 96,631 | 3451.1 | 63.73 |
| Carbon Dioxide | 20,240 | 460.0 | 8.49 |
| Hydrogen | 2,057 | 1028.4 | 18.99 |
| Water | 6,485 | 360.3 | 6.66 |
| Nitrogen and Argon | 1,680 | 60.0 | 1.11 |
| Hydrogen Sulfide | 1,782 | 52.4 | 0.97 |
| Carbonyl Sulfide | 168 | 2.8 | 0.05 |
| Total | 129,043 | 5415.0 | 100.00 |
| Ungasified Coal and Ash, lb/hr. | 7,189 |  |  |
| Total CO Produced |  |  |  |
| lb/hr | 96,631 |  |  |
| lb/lb coal | 1.751 |  |  |
| lb-moles/hr | 3,451 |  |  |
| Total CO + $H_2$ Produced |  |  |  |
| lb-moles/hr | 4479.5 |  |  |
| lb-moles/lb coal | 0.0812 |  |  |

EXAMPLE 3

This example illustrates and compares the gasification process of the present invention to those of Examples 1 and 2. The reactant feeds for the gasifier are the same as those in Example 2. Table III shows the components and amounts of the mixed gas conveyed to the indirect heat exchanger, the components and amounts of gas contained in the carbon monoxide-rich gas coming from the heat exchanger after the reverse water gas shift reaction, the total amount of carbon monoxide produced, and the overall amount of carbon dioxide imported to the process.

TABLE III

| Mixed Gas | | lb/hr | lb-moles/hr | vol. % |
|---|---|---|---|---|
| Carbon Dioxide | | 89,593 | 2036.2 | 47.24 |
| Hydrogen | | 4,114 | 2056.8 | 47.71 |
| Methane | | 3,482 | 217.6 | 5.05 |
| | Total | 97,189 | 4310.6 | 100.00 |
| Carbon Monoxide-Rich Gas | | lb/hr | lb-moles/hr | vol. % |
| Carbon Monoxide | | 28,795 | 1028.4 | 23.86 |
| Hydrogen | | 2,057 | 1028.4 | 23.86 |
| Carbon Dioxide | | 44,343 | 1007.8 | 23.38 |
| Water Vapor | | 18,512 | 1028.4 | 23.86 |
| Methane | | 3,482 | 217.6 | 5.04 |
| | Total | 97,189 | 4310.6 | 100.00 |
| Carbon Monoxide Recovered, lb-moles/hr | | | 1028.4 | |
| Overall Carbon Dioxide Imported, lb-moles/hr | | | 1304.4 | |

The amount of carbon monoxide recovered in Table III (1028.4 lb-moles/hr) is added to the amount produced in Table II (3451.1 lb-moles/hr), yielding a total amount of carbon monoxide produced (4479.5 lb-moles/hr) by the process of the present invention. The total amount of carbon monoxide produced in accordance with the invention, when the combination of CO from Examples 2 and 3 is taken, is approximately 30 percent higher than the carbon monoxide produced in situ within the gasifier as in Example 2. The total carbon monoxide produced in accordance with the invention is about 80 percent higher than produced in situ within the gasifier as in Example 1.

Table IV shows a heat balance across the heat exchanger 94 of FIG. 2.

TABLE IV

| | Million of Btu's/hr |
|---|---|
| Heat In | |
| Enthalpy of raw gas @ 2000° F. | 101.9 |
| Enthalpy of mixed gas @ 450° F. | 13.6 |
| Total Input | 115.5 |
| Heat Out | |
| Enthalpy of carbon monoxide-rich gas @ 1500° F. | 55.1 |
| Enthalpy of cooled raw gas @ 910° F. | 41.0 |
| Standard endothermic heat of reaction for 1028.4 lb. moles of $CO_2$ reacting ($CO_2 + H_2 \rightarrow CO + H_2O$) | 18.2 |
| Heat Losses | 1.2 |
| Total Output | 115.5 |

In the prior art method, the raw gas would be sent directly to a waste heat recovery unit thereby affording 101.9 million Btus per hour of enthalpy valve for generation of steam. Instead, with this invention, the cooled raw gas would be sent to a steam generator (41.0 million Btu per hour) as would the carbon monoxide-rich gas (55.1 million Btu per hour). The total heat available for steam generation in accordance with the invention (41.0+55.1=96.1 million Btus per hour) is still about 94% of the heat available in practice with the prior art (101.9 million Btus per hour). Thus the invention represents a very efficient means of supplying the necessary endothermic heat for the reverse water gas shift reaction.

The foregoing has described a process for the gasification of carbonaceous materials where the yield of carbon monoxide is increased. In a typical entrained gasification process the gas produced is composed of carbon monoxide and hydrogen in major quantities, and carbon dioxide, hydrogen sulfide, water and methane in minor quantities. By the process of the present invention the carbon monoxide produced by gasification of carbonaceous materials equals the amount of carbon monoxide normally produced plus an amount of carbon monoxide that is equal to the amount of available hydrogen in the gas from the gasifier. This increased yield is accomplished in an efficient, safe, and economical manner and provides a carbon monoxide-rich gas for ore reduction processes or chemical feedstock applications.

I claim:

1. A process for producing increased amounts of a carbon monoxide-rich gas in the gasification of carbonaceous materials, comprising:
   (a) reacting the carbonaceous materials with a gasifying entraining medium selected from the group comprising oxygen; oxygen and steam; oxygen and carbon dioxide; oxygen, carbon dioxide, and steam; oxygen and water; oxygen, water and carbon dioxide at temperatures in the range of about 1300° F. to about 3500° F. at a pressure in the range of about 1 to about 175 atmospheres absolutes to produce raw gases containing predominantly carbon monoxide and hydrogen, along with carbon dioxide, water, hydrogen sulfide, and methane;
   (b) contacting indirectly the hot raw gas in a heat exchanger with a gas containing predominantly carbon dioxide and hydrogen that is in contact with a water gas shift reaction catalyst, thereby cooling said raw gas while simultaneously supplying heat to the carbon dioxide and hydrogen containing gas;
   (c) treating the cooled raw gas to remove hydrogen sulfide, carbon dioxide, and water from the raw gas;
   (d) separating and collecting carbon monoxide, as a first portion of the carbon monoxide-rich gas product, and hydrogen from the treated, cooled raw gas in different zones;
   (e) combining the separated and collected hydrogen with carbon dioxide to form a gas containing predominantly carbon dioxide and hydrogen;
   (f) conveying the gas containing predominantly carbon dioxide and hydrogen to the heat exchanger of step (b) to indirectly contat the raw gas while the gas containing predominantly carbon dioxide and hydrogen is in contact with a water gas shift reaction catalyst wherein the hot raw gas provides the heat necessary to perform the endothermic reaction between carbon dioxide and hydrogen to produce the carbon monoxide-containing gas;
   (g) separating and collecting the carbon monoxide from the carbon monoxide-containing gas; and (h) combining said carbon monoxide with the first portion of carbon monoxide previously collected to produce a carbon monoxide-rich gas.

2. Process according to claim 1 wherein the carbon dioxide supplied to step (e) of claim 1 is all or a portion of the carbon dioxide recovered in step (c) along with additional carbon dioxide imported from an external source.

3. Process according to clam 2 wherein the carbon dioxide supplied from an external source is produced in an ore reduction process.

4. Process according to claim 1 wherein the gasification reaction is a partial oxidation of a carbonaceous feed in suspension with oxygen and carbon dioxide.

5. Process according to claim 1 wherein any unreacted carbon dioxide and hydrogen remaining after the carbon monoxide is separated and collected from the carbon monoxide-containing gas is recycled and combined with hydrogen and carbon dioxide to undergo the reverse water gas shift reaction.

6. Process according to claim 1 wherein hydrogen removed from the raw gas is purified of nitrogen and argon before being combined with carbon dioxide.

7. Process according to claim 6 wherein the gas containing predominantly carbon dioxide and hydrogen is preheated before reaction in presence of the catalyst.

8. Process acccording to claim 7 wherein the preheating is performed by indirectly contacting the carbon dioxide and hydrogen-containing gas with raw gas before reaction in the presence of the catalyst.

9. Process according to claim 1 wherein the reaction of carbon dioxide and hydrogen is conducted at an elevated pressure in the range from about 20 to about 175 atmospheres.

10. Process according to claim 8 wherein the gas containing predominantly carbon dioxide and hydrogen after being preheated with the raw gas is at a temperature greater than that at which elemental carbon can theoretically form from said gas upon the subsequent reaction of the carbon dioxide and hydrogen in the presence of the water gas shift reaction catalyst.

11. Process according to claim 1 wherein the carbon monoxide-containing gas leaving the heat exchanger after reverse water gas shift reaction is at a temperature of at least 1300° F. to maintain the methane concentration in said gas below about 40% by volume.

12. Process according to claim 1 wherein the carbon dioxide introduced to the gasifier is preheated indirectly with said raw gas or with the carbon monoxide-containing gas leaving the heat exchanger after the reverse water gas shift reaction.

13. Process according to claim 1 wherein the amount of carbon monoxide produced by the reverse water gas shift reaction is equal on a molar basis to the amount of available hydrogen present in the raw gas produced by the gasification of the carbonaceous materials.

14. Process according to claim 1 wherein the carbon monoxide-containing gas produced from the reverse water gas shift reaction is used to indirectly heat all or a portion of the carbon monoxide-rich product gas.

15. Process according to claim 1 wherein the methane contained in the raw gas is recovered with the hydrogen that is recovered from the raw gas and is thereby present in the gas containing predominantly carbon dioxide and hydrogen whereby the methane contacts the water gas shift reaction catalyst and is converted to carbon monoxide or hydrogen.

16. Process according to claim 1 wherein the raw gas contains less than 0.1 percent by volume of free oxygen.

17. Process according to claim 1 wherein the treated, cooled raw gas is dried.

18. Process according to claim 1 wherein the first portion of carbon monoxide is recovered in a separate recovery zone from the second portion of carbon monoxide.

19. Process according to claim 1 wherein the first and second portions of carbon monoxide are recovered in the same recovery zone.

20. A process for producing increased amounts of a carbon monoxide-rich gas in the gasification of carbonaceous materials, comprising:

(a) reacting the carbonaceous materials by partial oxidation at a temperature in the range of about 1300° F. to around 3500° F. in suspension with oxygen and carbon dioxide or preheated carbon dioxide at atmospheric or superatmospheric pressure to produce a raw gas containing predominantly carbon monoxide and hydrogen, with smaller amounts of carbon dioxide, water, hydrogen sulfide, and minor amounts of methane;

(b) contacting indirectly the hot raw gases in a second stage of a heat exchanger with a preheated gas containing predominantly carbon dioxide and hydrogen that is in contact with a water gas shift reaction catalyst;

(c) contacting indirectly the hot raw gases in a first stage of said heat exchanger with a gas containing predominantly carbon dioxide and hydrogen to preheat the gas to a temperature in the rnge of about 850° F. to about 950° F.;

(d) treating the cooler raw gas leaving the first stage of said heat exchanger to recover heat and to remove particulates hydrogen sulfide, water, and unavoidably some carbon dioxide, from the raw gas;

(e) recovering carbon dioxide that remains in the raw gas after step (d);

(f) recovering carbon monoxide from the raw gas;

(g) recovering hydrogen from the raw gas;

(h) combining the recovered carbon dioxide and recovered hydrogen with carbon dioxide from a source external to the process and with recycle gases;

(i) preheating said combined gas containing predominantly carbon dioxide and hydrogen in said first stage of said heat exchanger by indirect contact with said hot raw gases to a temperature in the range of about 850° F. to about 950° F.;

(j) contacting indirectly the preheated combined gas with the hot raw gas in said second stage of said heat exchanger wherein the hot raw gas provides the heat necessary to perform the endothermic reaction of carbon dioxide with hydrogen in the presence of an effective amount of water gas shift reaction catalyst to produce a carbon monoxide-rich gas containing predominantly carbon monoxide and water;

(k) removing water from the carbon monoxide-rich gas;

(l) removing the carbon monoxide from the carbon monoxide-rich gas as the second portion of carbon monoxide, leaving behind a recycle gas containing methane, some unreacted carbon dioxide and hydrogen;

(m) recycling the recycle gas to be combined with the carbon dioxide and hydrogen to form the combined gas; and (n) adding the second portion of carbon monoxide to the first portion of carbon monoxide recovered from the raw gas to produce the product carbon monoxide-rich gas.

21. Process according to claim 20 wherein carbon dioxide removed from the raw gas with hydrogen sulfide is recovered and combined with the carbon dioxide and hydrogen and recycle gas to undergo the reverse water gas shift reaction.

22. Process according to claim 20 wherein the external source of carbon dioxide is from an ore reducing process.

23. Process according to claim 20 wherein water produced in the reverse water gas shift reaction is removed from the carbon monoxide-rich gas before the carbon monoxide is recovered to produce the second portion of carbon monoxide.

24. In a gasification process for producing a gas containing predominantly carbon monoxide and hydrogen from carbonaceous materials at elevated temperatures the improvement comprising:

(a) conveying hot raw gas from the gasifier to a heat exchanger to indirectly contact a gas containing predominantly carbon dioxide and hydrogen in the presence of a water gas shift reaction catalyst to produce a carbon monoxide-containing gas.

25. A process for producing increased amounts of carbon monoxide in the gasification of carbonaceous materials, comprising:

(a) gasifying carbonaceous material with a gasifying medium of oxygen in the range of about 1300° F. to about 3500° F. at a pressure of about 1 to about 175 atmospheres absolute to produce raw gas containing predominantly carbon monoxide and hydrogen along with some carbon dioxide;

(b) contacting indirectly the hot raw gas in a heat exchanger with a gas containing carbon dioxide and hydrogen so the raw gas is cooled while simultaneously supplying heat to the carbon dioxide and hydrogen containing gas to produce a carbon monoxide containing gas by the reverse water gas shift reaction;

(c) obtaining carbon monoxide from the cooled raw gas; and (d) obtaining carbon monoxide from the carbon monoxide-containing gas.

26. Process according to claim 25 wherein the gas containing carbon dioxide and hydrogen is obtained from an external source.

27. Process according to claim 25 wherein the gas containing carbon dioxide and hydrogen is obtained from the raw gas produced in the gasification of carbonaceous materials.

28. Process according to claim 27 wherein supplemental amounts of carbon dioxide for the gas containing carbon dioxide and hydrogen is obtained from a source external to the gasification process.

29. Process according to claim 27 wherein supplemental amounts of hydrogen for the gas containing carbon dioxide and hydrogen is obtained from a source external to the gasification process.

* * * * *